US009244494B2

(12) United States Patent  (10) Patent No.: US 9,244,494 B2
Hinson  (45) Date of Patent: Jan. 26, 2016

(54) ELECTRONIC RETRACTABLE BLUEPRINT DISPLAY DEVICE FOR VIEWING AND MANIPULATING FULL-SIZE AND HALF-SIZE ARCHITECTURAL, ENGINEERING, AND CONSTRUCTION PLANS

(71) Applicant: Matthew C. Hinson, McKinney, TX (US)

(72) Inventor: Matthew C. Hinson, McKinney, TX (US)

(73) Assignee: Matthew C. Hinson, McKinney, TX (US)

( * ) Notice: Subject to any disclaimer, the term of this patent is extended or adjusted under 35 U.S.C. 154(b) by 128 days.

(21) Appl. No.: 14/145,074

(22) Filed: Dec. 31, 2013

(65) Prior Publication Data

US 2014/0362512 A1  Dec. 11, 2014

Related U.S. Application Data

(60) Provisional application No. 61/956,297, filed on Jun. 6, 2013, provisional application No. 61/961,158, filed on Oct. 7, 2013.

(51) Int. Cl.
| | |
|---|---|
| *G06F 1/16* | (2006.01) |
| *G06F 15/02* | (2006.01) |
| *H05K 5/00* | (2006.01) |
| *H05K 7/00* | (2006.01) |
| *G03B 21/56* | (2006.01) |
| *G09G 3/00* | (2006.01) |
| *G09G 3/34* | (2006.01) |
| *G06F 3/038* | (2013.01) |
| *G09F 11/08* | (2006.01) |
| *G09F 9/30* | (2006.01) |
| *G09F 11/21* | (2006.01) |
| *G09F 11/02* | (2006.01) |

(52) U.S. Cl.
CPC ............ *G06F 1/1652* (2013.01); *G06F 1/1601* (2013.01); *G06F 1/1607* (2013.01); *G06F 1/1616* (2013.01); *G06F 1/1658* (2013.01); *G06F 15/025* (2013.01); *G09F 9/301* (2013.01); *G09F 11/02* (2013.01); *G09F 11/08* (2013.01); *G09F 11/21* (2013.01)

(58) Field of Classification Search
CPC ... G06F 1/1601; G06F 1/1607; G06F 1/1616; G06F 1/1652; G09F 9/301; G09F 11/02; G09F 11/08; G09F 11/21
USPC ........... 361/679.21, 679.26, 679.27; 359/443, 359/450, 451, 454, 461; 345/30, 108, 205, 345/905; 349/58; 248/917, 918, 919, 920, 248/924; 455/575.3, 575.4; 348/333.06, 348/333.07, 375; 40/493
See application file for complete search history.

(56) References Cited

U.S. PATENT DOCUMENTS 6,498,597 B1 * 12/2002 Sawano ........................ 345/107
7,050,835 B2    5/2006 Hack et al.
(Continued)

*Primary Examiner* — Hoa C Nguyen
*Assistant Examiner* — Binh Tran
(74) *Attorney, Agent, or Firm* — Howison & Arnott, LLP

(57) ABSTRACT

Provided is a modular display device for providing a digital representation of a blueprint. In one example, the device includes an elongated housing having an elongated opening parallel to a longitudinal axis of the housing. A core is configured to fit inside the housing in a rotatable manner. A flexible display is configured to move between one state where a majority of the flexible display is positioned inside the housing and rolled around the core and another state where a majority of the flexible display is moved out of the housing through the opening and positioned outside of the housing to form a viewing surface. A height and a width of the flexible display are sufficient to provide a 1:1 scale view of a drawing having dimensions defined by a drawing standard used in at least one of an architectural industry, an engineering industry, or a construction industry.

18 Claims, 18 Drawing Sheets

(56) References Cited

U.S. PATENT DOCUMENTS

| | | |
|---|---|---|
| 7,463,238 B2 * | 12/2008 | Funkhouser et al. ......... 345/107 |
| 7,639,237 B2 | 12/2009 | Perkins |
| 7,667,962 B2 | 2/2010 | Mullen |
| 7,953,462 B2 | 5/2011 | Harry |
| 2003/0050019 A1 | 3/2003 | Dowling et al. |
| 2008/0212271 A1 * | 9/2008 | Misawa ......................... 361/681 |
| 2011/0227822 A1 * | 9/2011 | Shai .............................. 345/156 |

* cited by examiner

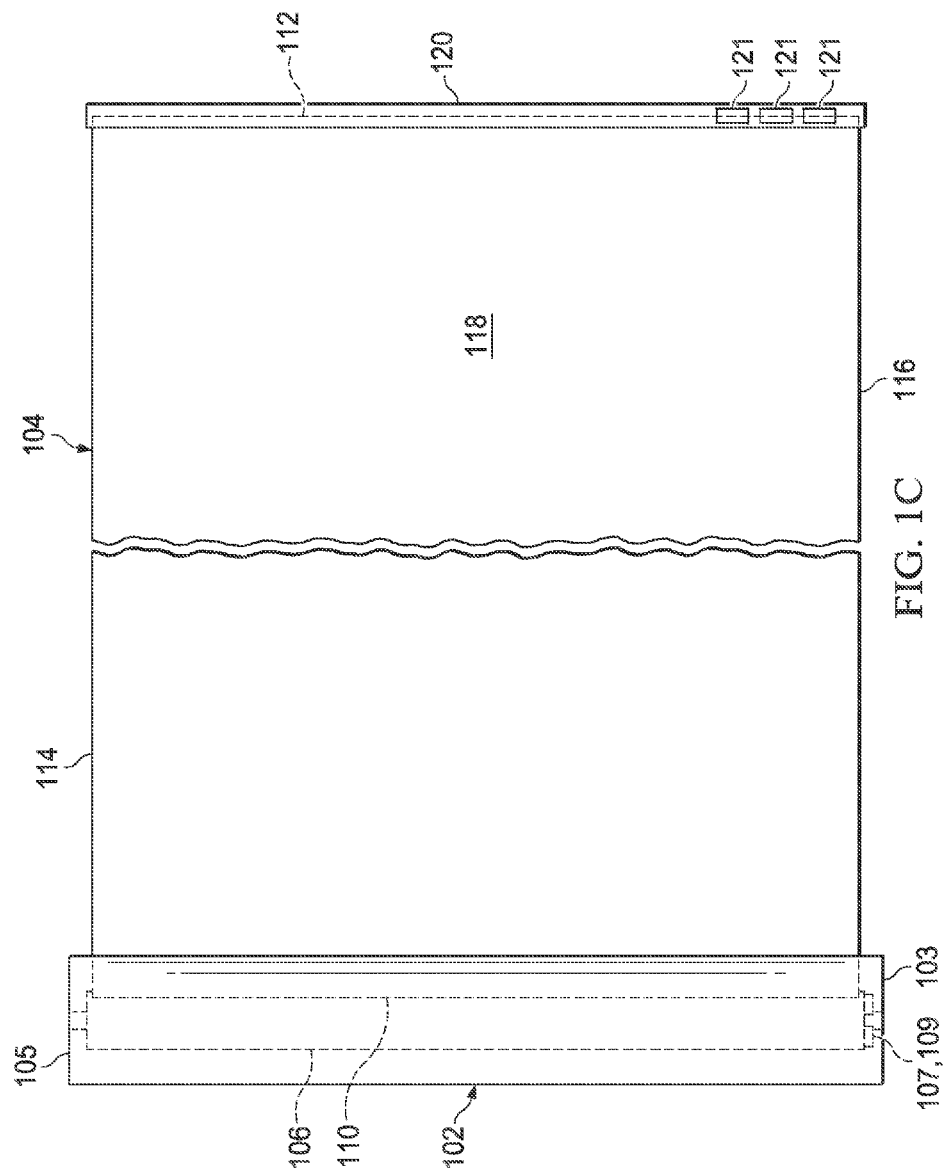

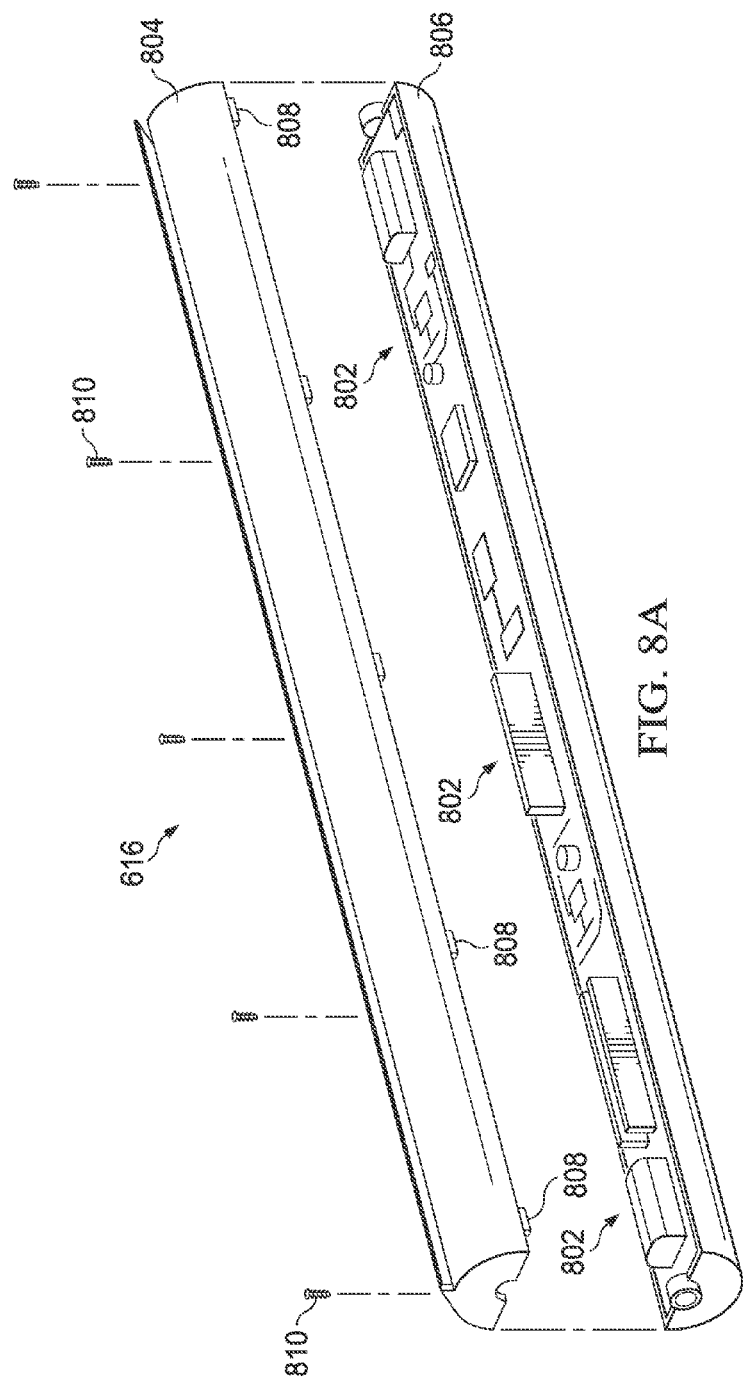
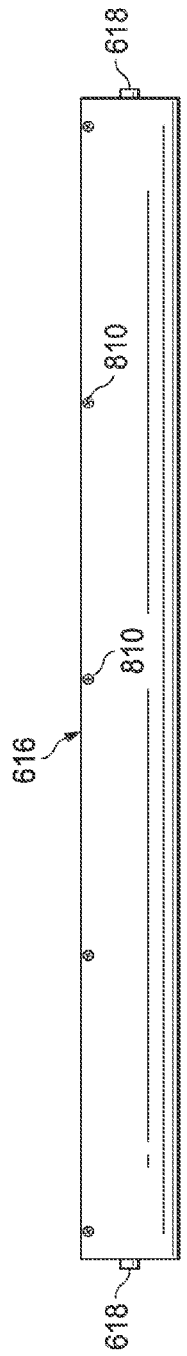
FIG. 8A
FIG. 8B

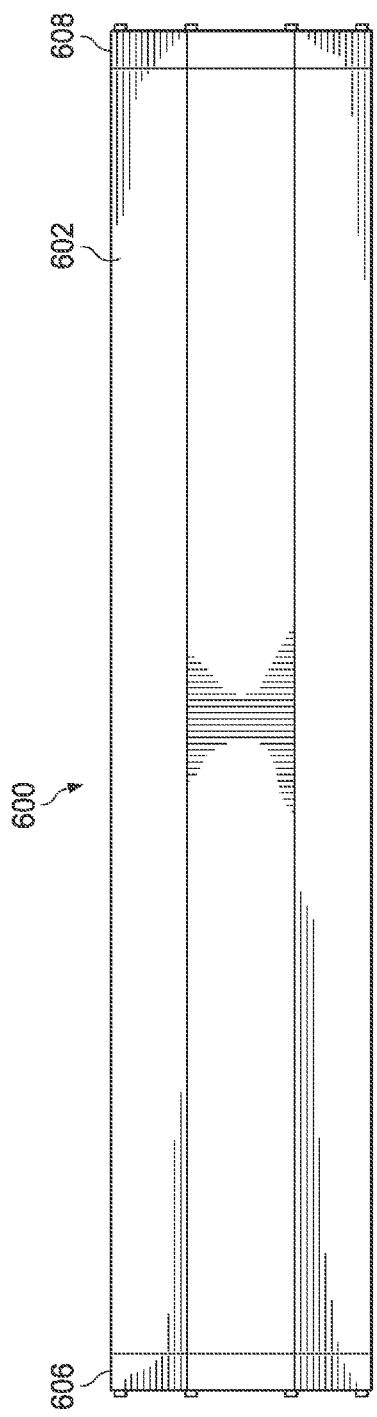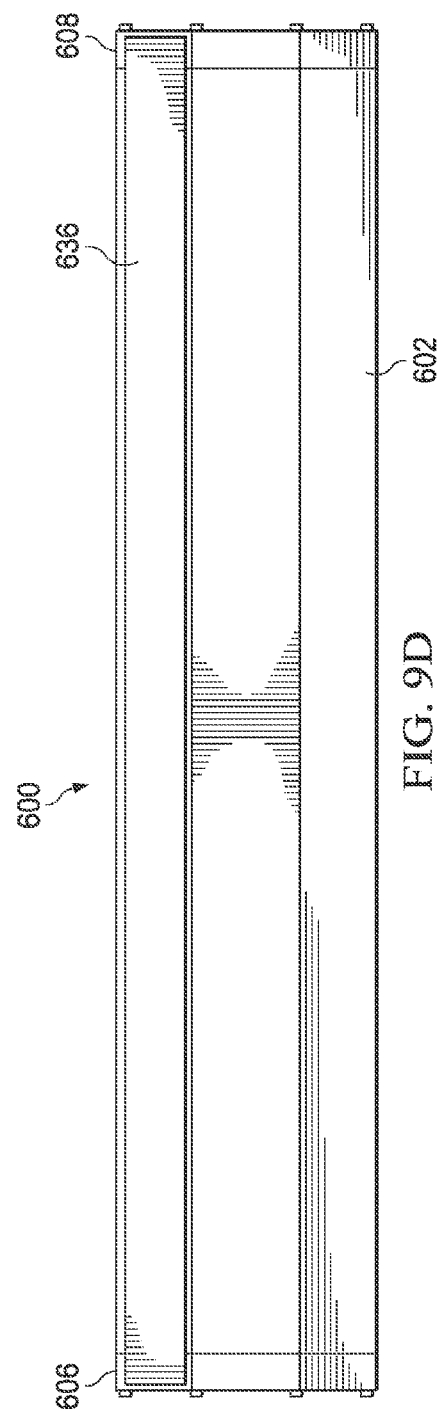

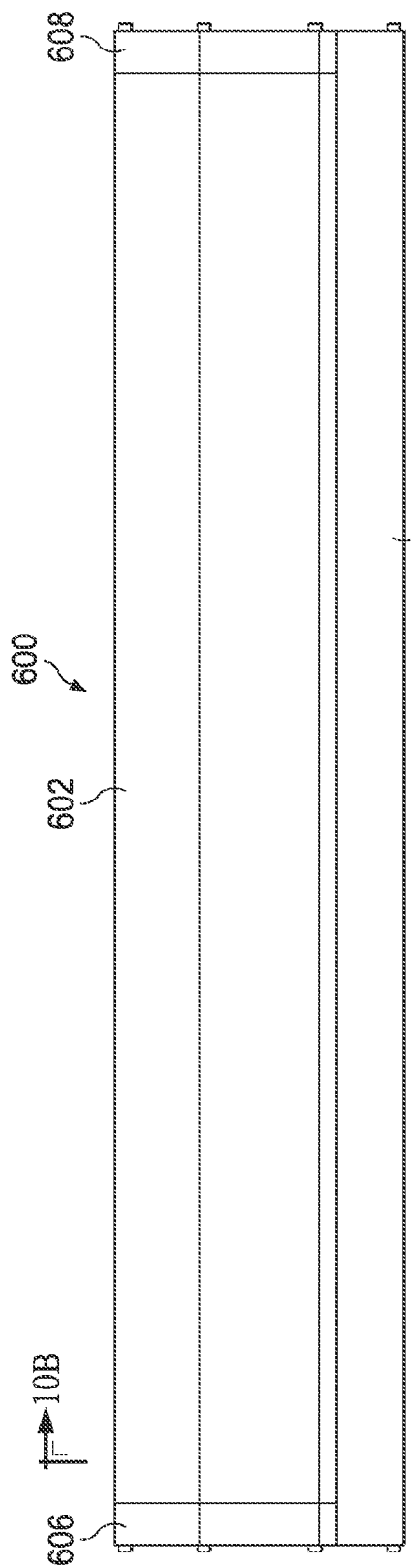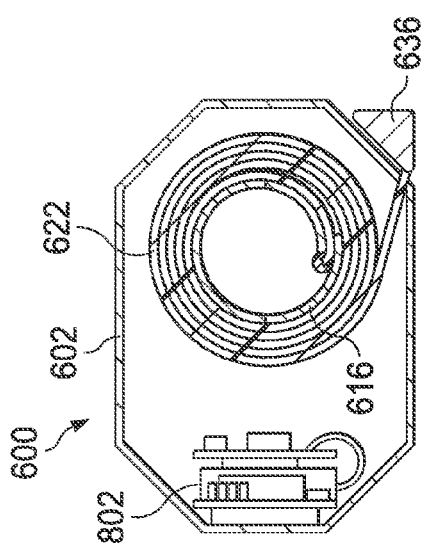

ELECTRONIC RETRACTABLE BLUEPRINT DISPLAY DEVICE FOR VIEWING AND MANIPULATING FULL-SIZE AND HALF-SIZE ARCHITECTURAL, ENGINEERING, AND CONSTRUCTION PLANS

CROSS-REFERENCE TO RELATED APPLICATIONS

This application claims the benefit of U.S. Provisional Application No. 61/956,297, filed Jun. 6, 2013, entitled ELECTRONIC RETRACTABLE BLUEPRINT DISPLAY DEVICE FOR VIEWING AND MANIPULATING FULL-SIZE AND HALF-SIZE ARCHITECTURAL, ENGINEERING, AND CONSTRUCTION PLANS, and U.S. Provisional Application No. 61/961,158, filed Oct. 7, 2013, entitled ELECTRONIC RETRACTABLE BLUEPRINT DISPLAY DEVICE FOR VIEWING AND MANIPULATING FULL-SIZE AND HALF-SIZE ARCHITECTURAL, ENGINEERING, AND CONSTRUCTION PLANS, both of which are incorporated by reference herein in their entirety.

BACKGROUND

Drawings used in the architectural, engineering, and construction (AEC) industries are typically relatively large. Such drawings introduce issues in how they are transported, maintained, and managed. Accordingly, improvements are needed.

BRIEF DESCRIPTION OF THE DRAWINGS

For a more complete understanding, reference is now made to the following description taken in conjunction with the accompanying Drawings in which:

FIGS. 1A-1C illustrate one embodiment of a display device;

FIGS. 8A-8G illustrate orthogonal, front side, back side, top side, bottom side, left side, and right side views, respectively, of one embodiment of a core that may be used with the device of FIG. 6A;

FIGS. 9A-9F illustrate front side, back side, top side, bottom side, left side, and right side views, respectively, of one embodiment of the device of FIG. 6A;

FIG. 10A illustrates a front side view of another embodiment of the device of FIG. 6A; and FIG. 10B illustrates a cutaway side view of one embodiment of the device of FIG. 10A taken along lines A-A.

DETAILED DESCRIPTION

Figure 1A:
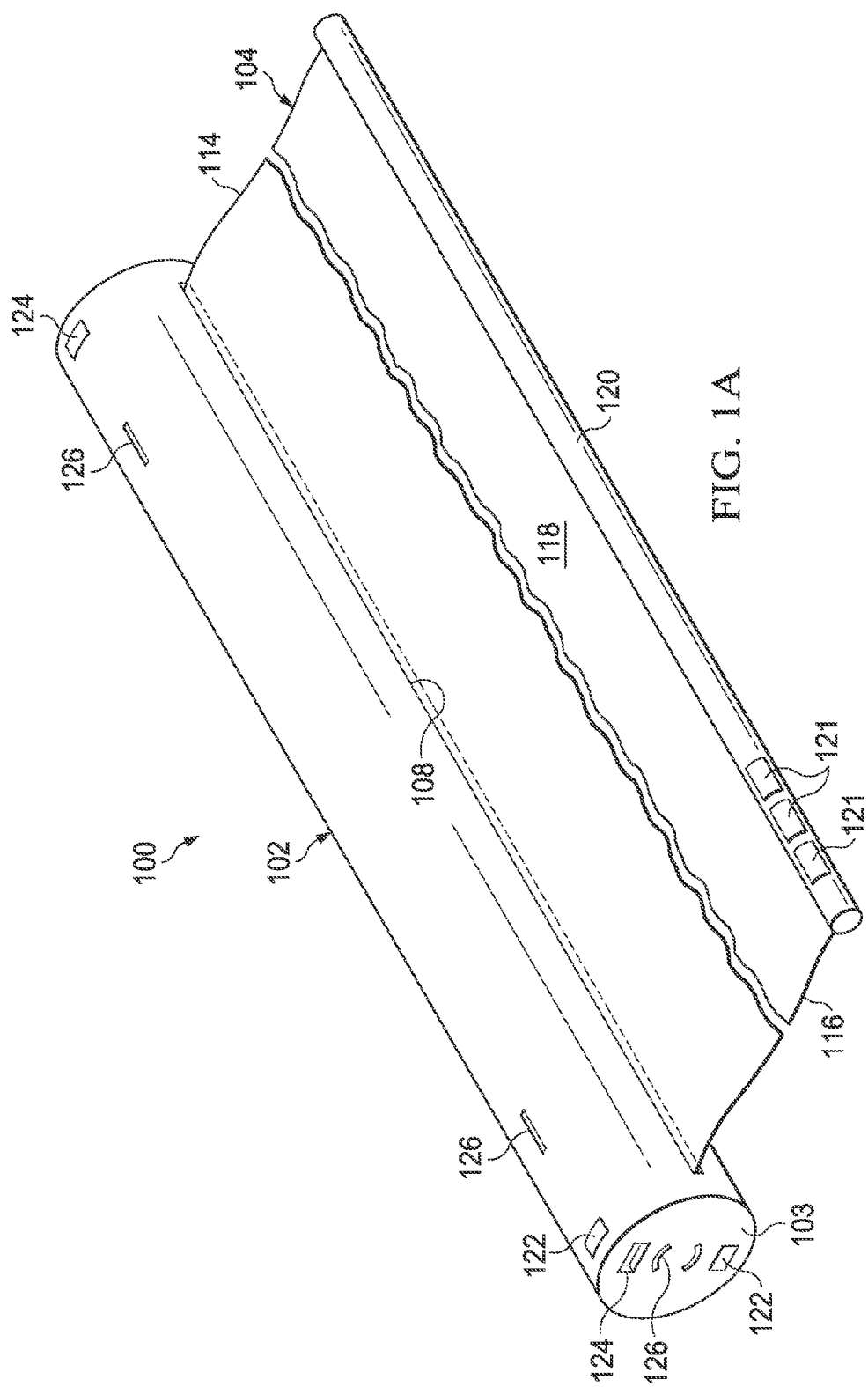

Referring now to the drawings, wherein like reference numbers are used herein to designate like elements throughout, the various views and embodiments of an electronic retractable blueprint display device are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Individuals working in the architectural, engineering, and construction (AEC) industries typically use large drawings that have dimensions that conform to a particular industry standard. For example, the drawing dimensions may be defined by a known standard detailed by an organization such as the International Organization for Standardization (ISO) or the American National Standards Institute (ANSI). Alternatively, the drawings may be a custom size defined by an in-house or other non-conventional specification. Regardless of the exact dimensions used, such drawings have conventionally been printed on large sheets of paper that are rolled up for transportation and storage. The drawings, which are also referred to herein as blueprints, often provide highly detailed specifications for buildings, engineering projects, and other projects that require accurate plans. The large size of the drawings may aid a user in clearly discerning specific details and so reducing the size increases the possibility that numbers, letters, lines, and other features will be overlooked or misread.

However, not only do conventional paper drawings represent a cumbersome approach due to the nature of large rolls of paper (e.g., difficult to manage and easily torn), but paper drawings are difficult to update and care must be taken not to use outdated drawings. While drawings may be available in digital format, AEC drawings are generally far too large to be fully viewable at a 1:1 scale on a portable device's digital display. In other words, a user must scroll around the digital display to see the entire drawing at a 1:1 scale or zoom out to see the full drawing. Scrolling around makes it difficult to get an overall view of the drawing, while zooming out to get an overall view reduces the amount of detail that is easily visible and increases the possibility that errors in reading the drawing will occur.

Larger digital screens may be used, but many users prefer to look at screens that can be laid flat like paper blueprints, rather than screens that are vertical like many larger digital screens. Furthermore, larger digital screens lack ease in portability. Accordingly, while conventional digital devices solve certain problems that occur with paper drawings, they introduce other issues. As such, it is clear that neither paper drawings nor currently available digital solutions are ideal.

Figure 1B:
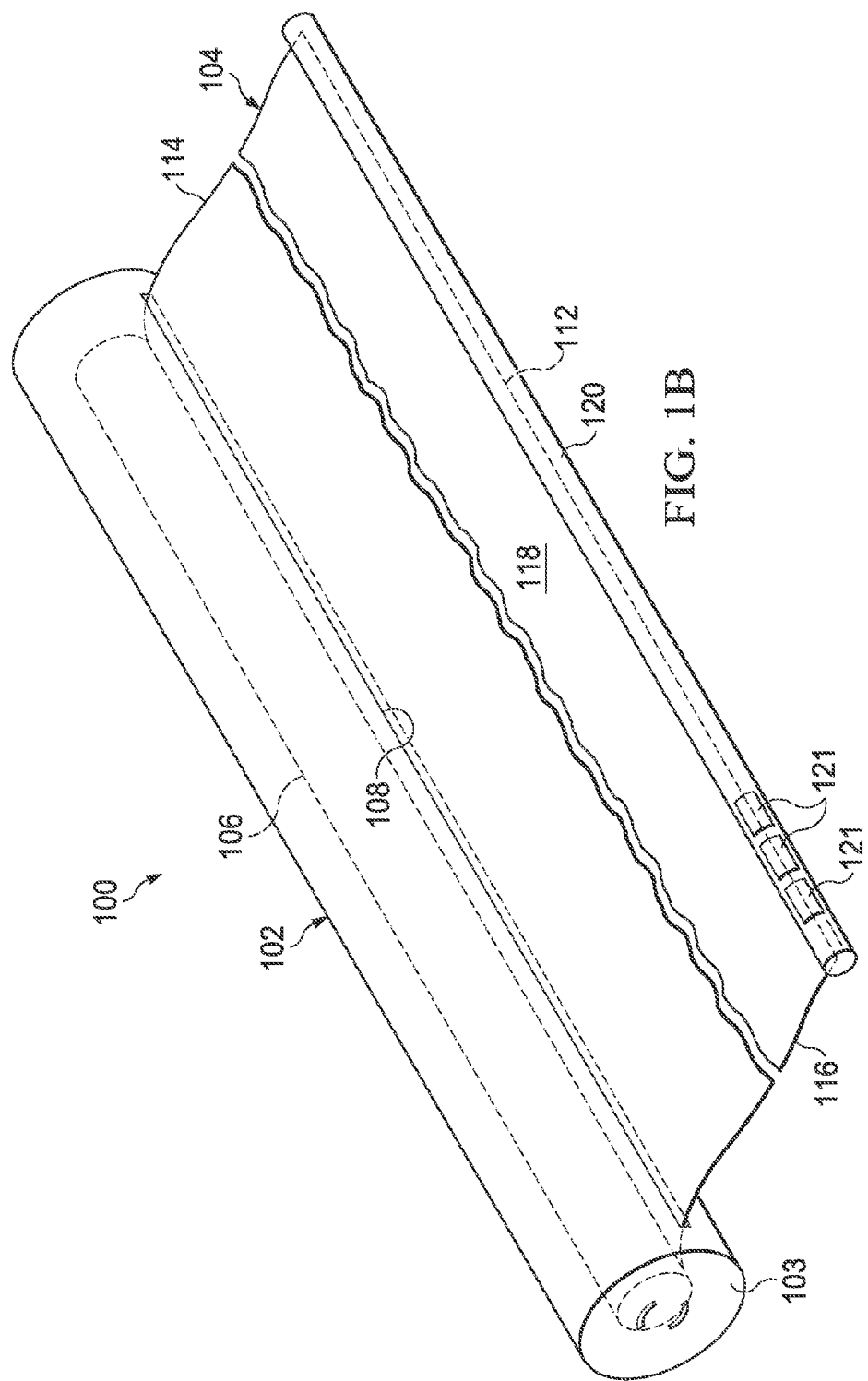

Referring to FIGS. 1A-1C, one embodiment of a retractable electronic blueprint display device 100 is illustrated that provides a portable large scale drawing solution. In the present example, the device 100 includes a housing 102 that contains a flexible display 104 and a core 106. The display 104 is coupled to the core 106, which is mounted within the housing 102 in a manner that allows the display 104 to be at least partially extracted from and returned to the housing 102 through an opening 108 in the housing 102.

In the present example, the housing 102 is a cylindrical tube having ends 103 and 105. However, it is understood that the housing 102 may be any substantially hollow elongated structure and may take many different overall shapes and may have many different cross-sectional shapes. For example, ovals, squares, rectangles, hexagons, octagons, and any other symmetrical and non-symmetrical shapes may be used for the housing 102. Furthermore, portions of the housing 102 may vary in width, thickness, and/or length. The housing 102 may be made of any suitable material or combination of materials, including metals, plastics, and glass.

The display 104 may be formed using a technology such as thin film transistors (TFTs), electronic paper, electronic ink (e.g., electrophoretic ink), organic light-emitting diodes (OLEDs), and/or similar technologies that can produce a flexible and rollable display. In some embodiments, technologies (e.g., e-ink) that are more easily visible in high ambient light environments (e.g., direct sunlight) may be preferred. This enables a user to more easily view the display 104 in work environments such as a construction site.

In the present example, the display 104 is substantially rectangular in shape with a left edge 110, a right edge 112, a top edge 114, a bottom edge 116, and a display surface 118. It is understood that terms such as "left," right," "top," and "bottom" are from the perspective of FIGS. 1A-1C and are for purposes of description only. The left edge 110 of the display 104 is coupled to the core 106. The display 104 is rolled around the core 106 when not in use. The core 106 is mounted within the housing 102 in a rotatable manner so that the display 104 can be partially or fully unrolled from the core 106 and extracted from the housing 102 to provide a viewing surface.

While the height of the display 104 is generally limited by the length of the housing 102, the width of the display 104 may be variable to a maximum length that is limited by ability of the housing 102 to contain the display 104 when rolled up. As described previously, however, the width of the display 104 in the present embodiment is based on providing a 1:1 scale representation of a drawing having defined dimensions. Additional display area may be provided for icons and other graphics features in some embodiments, while such features may be provided as overlays on the drawing itself in other embodiments.

In some embodiments, some portion of the display 104 may remain within the housing 102 even when fully unrolled. In other embodiments, the entire display 104 may be viewable when fully unrolled and a connector (e.g., one or more sheets of material) may couple the display 104 to the core 106. Such a connector may be formed as part of the display 104 or may be made separately and later coupled to the display 104.

The right edge 112 of the display 104 is coupled to an end bar 120, although it is understood that the end bar 120 may not be present in all embodiments. The end bar 120 is too large to fit through the opening 108 in the housing 102 and thereby serves as a stop to prevent the entire display 104 from entering the housing 102. In some embodiments, the end bar 120 may be weighted sufficiently to keep the display 104 from rolling up when pulled out. In other words, the end bar 120 may make it easier to keep the display 104 flat when opened in much the same way that setting a heavy object on the edge of a piece of paper prevents the paper from rolling up or moving.

In some embodiments, the end bar 120 may include control features 121 (e.g., buttons, touch sensitive areas, sliders, dials, knobs, and/or other interactive areas) that may be used to control the display 104 and/or other operations of the device 100. Connections for the control features 121 may run along the display 104 (e.g., along the top edge 114, bottom edge 116, and/or back side) to electronic components within the housing 102 or the control features 121 may be wirelessly connected to the electronic components within the housing 102.

In operation, when the end bar 120 is grasped and pulled away from the housing 102, the core 106 rotates and allows the display 104 to unroll and be partially or fully extracted from the housing 102. When the display 104 is partially or fully extracted, the pulling action on the end bar 120 is stopped. The core 106, which is configured to be under tension from a tension mechanism 107 (e.g., a spring) to rotate in a direction that returns the display 104 to the housing 102, locks in place using a locking mechanism 109 (e.g., an internal ratchet mechanism) to prevent the display 104 from automatically being pulled back into the housing 102 and rolled back around the core 106. To return the display 104 to the housing 102, the end bar 120 may be pulled out slightly to unlock the locking mechanism and released. The tension on the core 106 causes the core 106 to rotate, which rolls the display 104 back around the core 106. Because the end bar 120 is designed so that it cannot pass through the opening 108, the return process ends when the end bar 120 contacts the housing 102.

In embodiments without an end bar 120, it is understood that another stop mechanism would be used. Although shown only at one end of the device 100, it is understood that the tension mechanism 107 and locking mechanism 109 may be placed in separate locations (e.g., one at each end), may be located at both ends, or may be otherwise positioned.

The housing 102 may also include one or more control features 122, communication ports 124, and/or other components that may be used to interact with and/or control the display 104. The control features 122, communication ports 124, and/or other components may be mounted on the side and/or on one or both ends 103 and 105. Connections for the control features 122 and/or communication ports 124 may be coupled to electronic components within the housing 102 via wired connections or the control features 122 and/or communication ports 124 may be wirelessly connected to the electronic components within the housing 102.

In some embodiments, the housing 102 may include one or more vent openings 126 (e.g., slits, slots, and/or holes) that provide air intake and/or exhaust ports for cooling purposes. For example, the end 103 may have an air intake or exhaust opening, and the end 105 may have a corresponding air exhaust or intake opening. It is understood that the housing 102 may be constructed of a particular material and/or may include one or more shapes (e.g., heat sink fins) to aid in heat dissipation. For example, some or all of the material used to form the housing 102 may be thermally conductive to provide a heat transfer mechanism to aid in moving heat out of housing 102.

Figure 2:
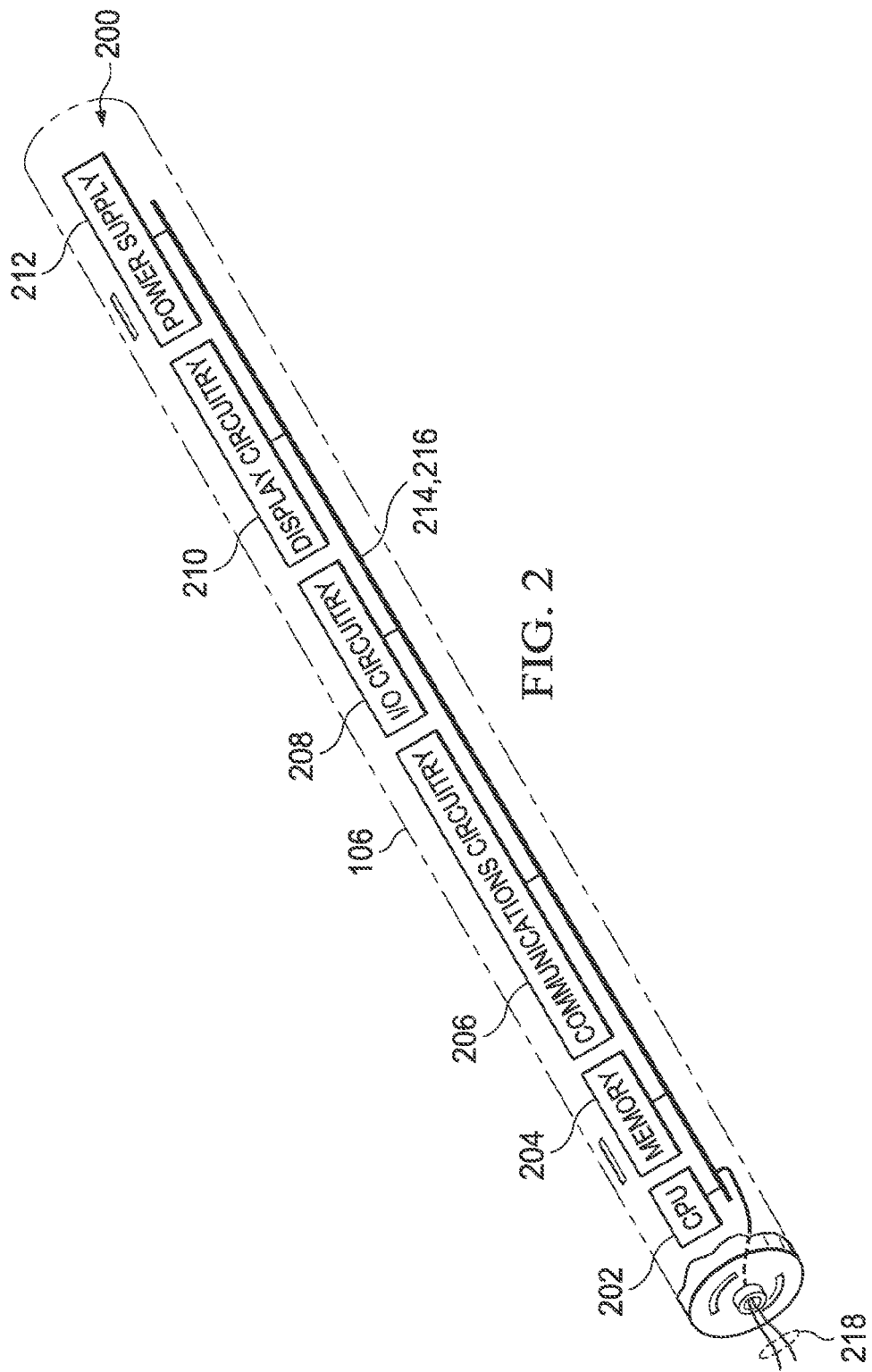
FIG. 2 illustrates one embodiment of a core that may be used in the device of FIG. 1A.

Referring to FIG. 2, one embodiment of the core 106 of FIGS. 1A-1C is illustrated in greater detail. Electronic components 200 that are used to control and/or power the display 104 can be mounted within the core 106 (as illustrated in FIG. 2 and further illustrated below with respect to FIG. 3A) and/or outside of the core 106 (as illustrated below with respect to FIG. 3B). It is understood that some embodiments may position some of the electronic components 200 inside the core 106 and others of the electronic components 200 outside of the core. Such positioning may depend on factors such as heat dissipation, space (e.g., the amount of room available inside the core 106 relative to the room required for the electronic components 200), and/or the shape of the housing 102.

The electronic components 200 may include a controller (e.g., a central processing unit (CPU)) 202, a memory unit 204, communications circuitry 206 (e.g., a network interface), input/output (I/O) circuitry 208, and display circuitry 210. Some or all of the components 200 are interconnected by a data transport system (e.g., a bus) 214. A power supply 212

(e.g., one or more batteries) may provide power to the other components 200 via a power transport system 216 (shown with data transport system 214, although the power and data transport systems may be separate).

It is understood that the electronic components 200 may be differently configured and that each of the listed components may actually represent several different components. For example, the CPU 202 may actually represent a multi-processor or a distributed processing system; the memory unit 204 may include different levels of cache memory, main memory, hard drive disks, solid state memory devices, and remote storage locations; the communications circuitry 206 may provide a network interface for wired and/or wireless connections to a network and local devices, the I/O circuitry 208 may be configured to communicate with monitors, keyboards, touch screens, and the like; and the display circuitry 210 may provide the functionality needed to display information on the display 104. In some embodiments, various functions may be combined. For example, a single integrated circuit may include the CPU 202 and display circuitry 210. Therefore, a wide range of flexibility is anticipated in the configuration of the electronic components 200.

The electronic components 200 may be controlled by any suitable operating system (or multiple operating systems), including various versions of operating systems provided by Microsoft (such as WINDOWS), Apple (such as Mac OS X), UNIX, and LINUX, and may include operating systems specifically developed for handheld devices. The operating system, as well as other instructions, may be stored in the memory unit 204 and executed by the processor 202. For example, the memory unit 204 may include instructions for performing some or all of the various processes described herein.

External connections to and from the electronic components 200 may be made either wirelessly or via a wired connection. Wired connections may, for example, occur via one or more wires 218 that are coupled to the electronic components 200 and extend out of the core 106. A slip ring connection or another suitable connection may be used to prevent the wires 218 from twisting when the core 106 rotates. The wires 218 may be connected to one or more of the control features 122 and/or communication ports 124 on the exterior of the housing 102 (FIG. 1A).

The communications circuitry 206 may provide communications functionality via such standards as 3G, 4G, WiFi, Bluetooth, and/or various near field communication technologies. The communications circuitry 206 may be configured to communicate bi-directionally with cellular telephones (including smart phones), personal digital assistants (PDAs), netbooks, tablets, laptops, desktops, workstations, servers (including cloud systems), and any other computing device that can communicate with another computing device using a wireless and/or wireline communication link. Such communications may be direct (e.g., via a peer-to-peer network, an ad hoc network, or using a direct connection), indirect, such as through a server or other proxy (e.g., in a client-server model), or may use a combination of direct and indirect communications.

In some embodiments, some or all of the electronic components 200 may not be present. In such embodiments, the display 104 may be coupled to an external device via a wired or wireless connection and the external device may drive the display 104. The external device may provide both data and power for the display 104 or may provide only data if the device 100 contains the power supply 212 to power the display 104. The external device may also provide the control features in some embodiments and the control features 121 and/or 122 may be absent.

Figure 3A:
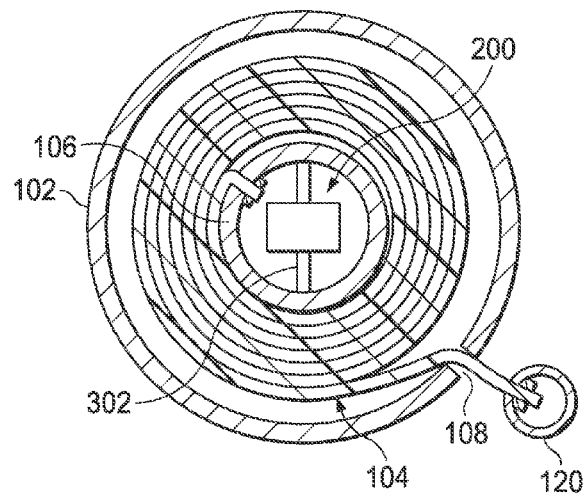
FIGS. 3A and 3B illustrate cross-sections of two different embodiments of the device of FIG. 1A.
Figure 3B:
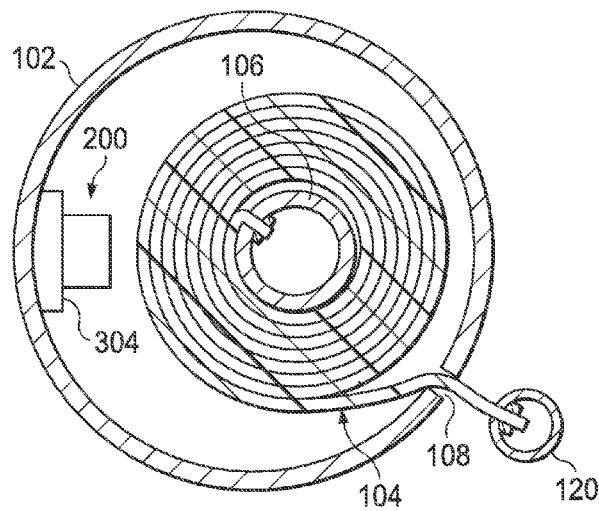

Referring to FIGS. 3A and 3B, two embodiments of the housing 102 of FIG. 1 are illustrated in cross-section. In FIG. 3A, the electronic components 200 of FIG. 2 are positioned within the core 106. The electronic components 200 may be mounted to a support structure 302 as illustrated or may be mounted directly to an inside wall of the core 106. In FIG. 3B, the electronic components 200 of FIG. 2 are positioned outside of the core 106. The electronic components 200 may be mounted to a support structure 304 as illustrated or may be mounted directly to an inside wall of the housing 102.

The configuration of FIG. 3A may provide a smaller possible cross-section than the configuration of FIG. 3B due to the positioning of the electronic components 200. However, the configuration of FIG. 3B may allow the use of a smaller diameter core 106 than the configuration of FIG. 3A, which in turn may provide more space within the housing 102 for the electronic components 200. Other factors, such as heat and interference (e.g., noise), may also play a role in the positioning of the electronic components 200. It is understood that such factors may be considered for a particular configuration of the device 100.

Figure 4:
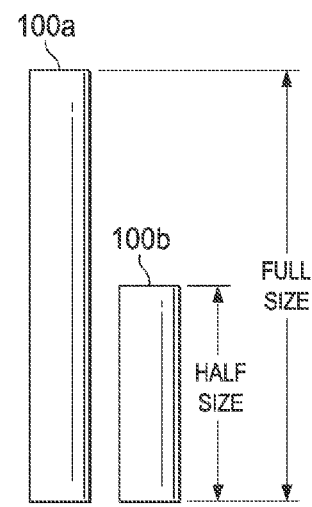
FIG. 4 illustrates top views of two different embodiments of the device of FIG. 1A.

Referring to FIG. 4, embodiments of the device 100 are shown with corresponding dimensions as either a full-size device 100a or a half-size device 100b. Because the device 100 of FIG. 1A is to provide a display that duplicates the dimensions of a defined blueprint size, the housing and display may vary in size to match commonly used blueprint dimensions. For example, the display 104 may be designed to provide a full-size (1:1) drawing in the device 100a, a half-size (1:2) drawing in the device 100b, and/or other drawing sizes based on a drawing scale that complies with desired dimensions. In some embodiments, the dimensions may be defined by a known standard detailed by an organization such as ISO or ANSI (e.g., the ANSI/ASME Y14.1 standard). Examples of standardized drawing dimensions are illustrated below in Table 1 (ISO) and Table 2 (ANSI/ASME).

TABLE 1

| ISO A DRAWING SIZES (mm) | |
| --- | --- |
| A4 | 210 × 297 |
| A3 | 297 × 420 |
| A2 | 420 × 594 |
| A1 | 594 × 841 |
| A0 | 841 × 1189 |

TABLE 2

| ANSI/ASME DRAWING SIZES (inches) | |
| --- | --- |
| A | 8.5 × 11 |
| B | 11 × 17 |
| C | 17 × 22 |
| D | 22 × 34 |
| E | 34 × 44 |
| D1 | 24 × 36 |
| E1 | 30 × 42 |

In other embodiments, the display may be a custom size defined by an in-house or other non-conventional size drawing. Accordingly, it is understood that the illustrated dimensions are for purposes of example only, and that the dimensions may vary to match any target size needed for the display 104.

In a more specific example, the length of the device 100*a* is approximately thirty inches to provide an E1 drawing height under the ANSI standard. This provides a full size display of around 30"×42" (with the display 104 being extendable to a width of at least 42"). The length of the device 100*b* is approximately fifteen inches. This provides a half-size E1 display of around 15"×21" (with the display 104 being extendable to a width of at least 21"). It is understood that the housing 102 is generally at least slightly longer than the height of the display 104 in order to fully contain the display 104, and so a device with a display 104 that is thirty inches in height will generally have a housing 102 that is more than thirty inches in length.

In some embodiments, the device 100*a* may be used to provide half-size blueprints in addition to full-size blueprints, thereby enabling a larger device to be more flexible in supported blueprint sizes than a smaller device. In such embodiments, the half-size blueprints may be shown in their correct 1:1 scale or may be scaled to fit the display 104. In some embodiments, a device may be configured to show all smaller drawing sizes. Accordingly, a device with a display 104 having the dimensions needed to show 1:1 scale ANSI E drawings would also be able to show A-D, E1, and D1 drawings. Similarly, a device with a display 104 having the dimensions needed to show 1:1 scale ISO A0 drawings would also be able to show A1-A4 drawings.

Figure 5A:
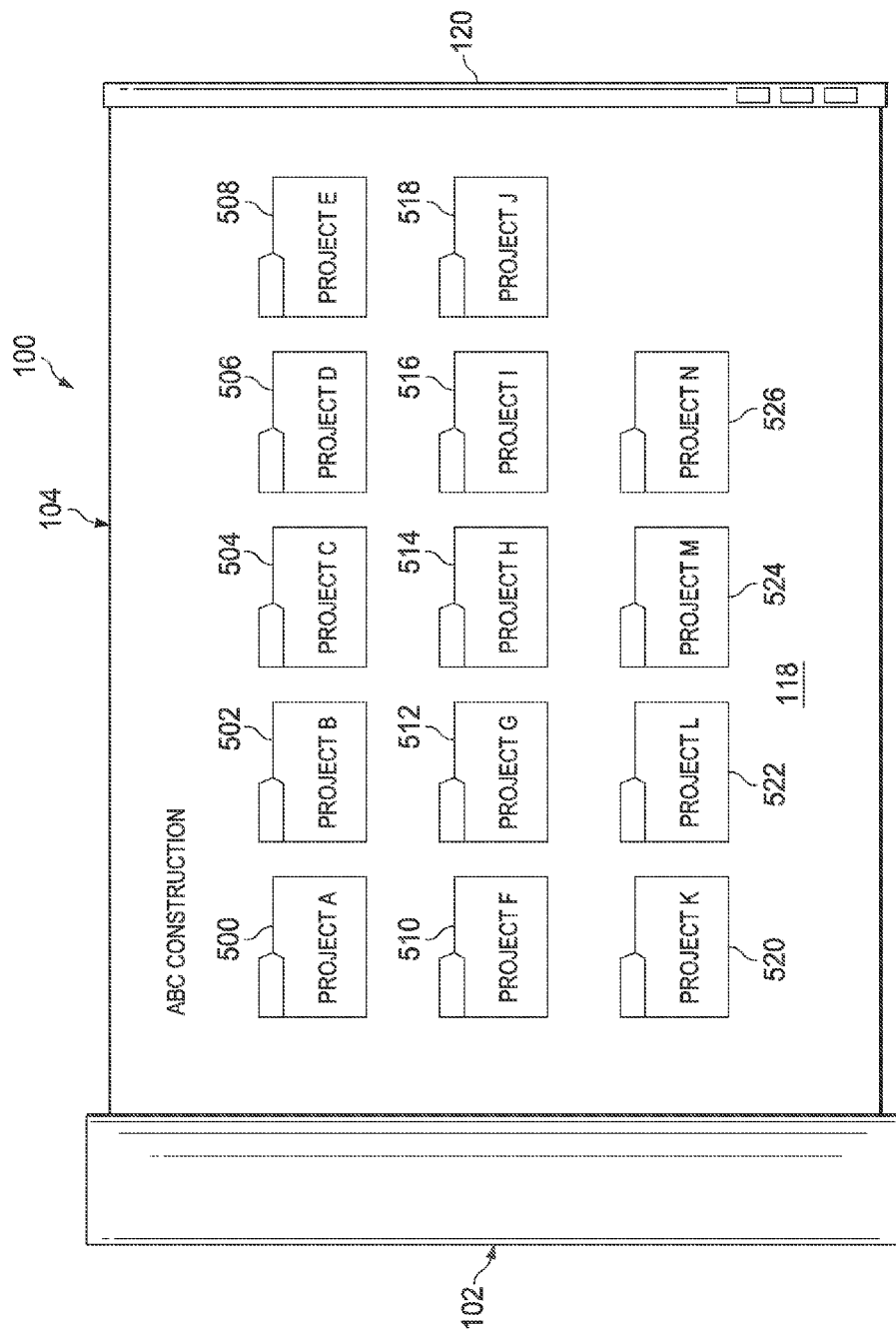
FIGS. 5A and 5B illustrate embodiments of displays that may be provided by the device of FIG. 1A.
Figure 5B:
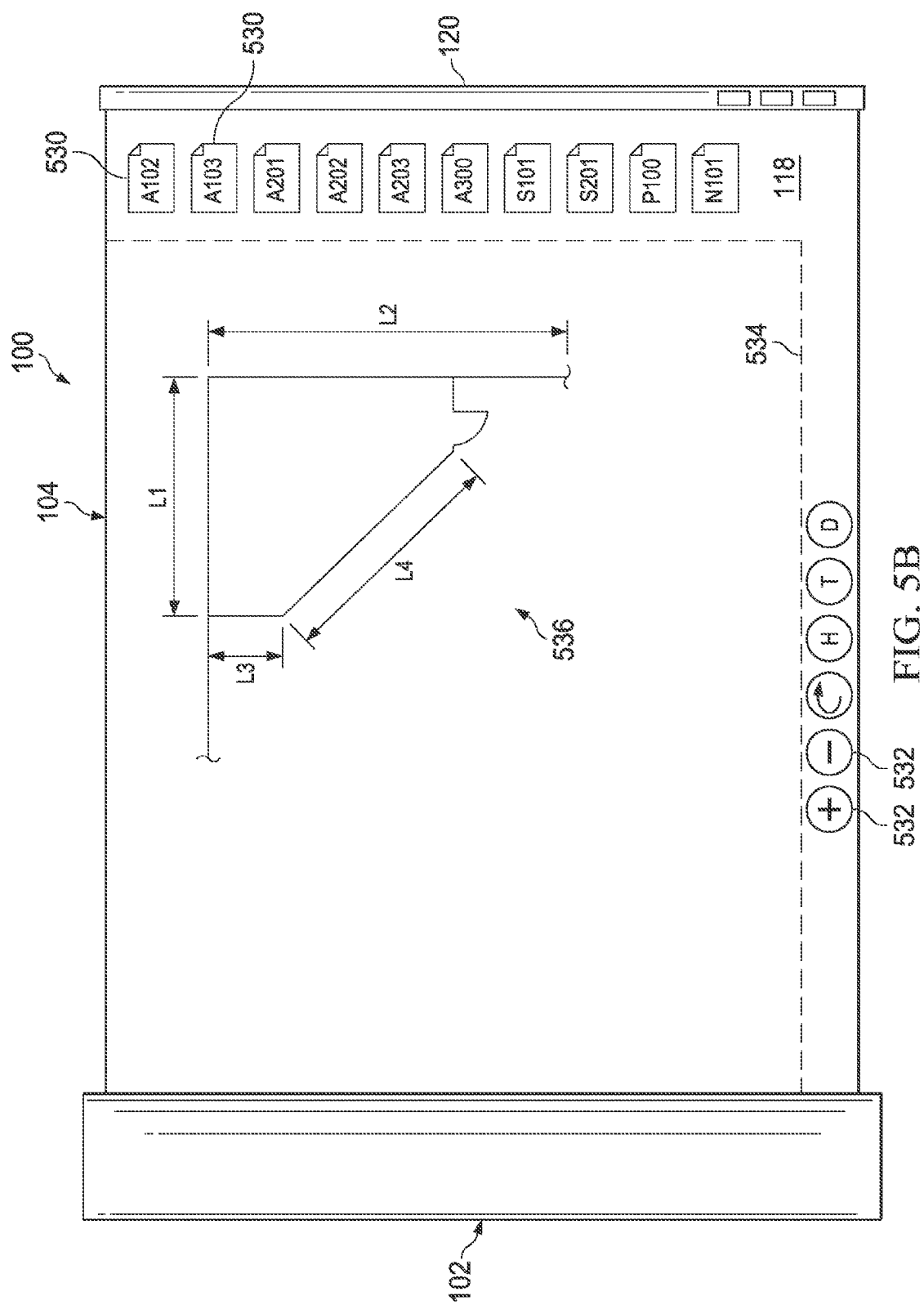

Referring to FIGS. 5A and 5B, embodiments of the display 104 of FIG. 1C are illustrated with various icons, control features, and other graphics. In FIG. 5A, a dashboard view illustrates various icons for project folders 500-526 that correspond to Projects A-N for a company named ABC Construction. Files for the project folders 500-526 may be locally stored (e.g., in the memory 204 of FIG. 2) or stored remotely from the device 100, such as in a server cloud. This provides the ability to go to a job site, download the latest files at the job site or while in route, and view the drawings in 1:1 or 1:2 scale. The communications port(s) 124 may be used to load files from a flash drive or another external source for viewing.

The project files within a particular folder 500-526 may be viewed by selecting one of the project icons. Selection may occur in various ways, such as using control features 122 on housing 102, control features 121 on end bar 120, and/or via other control mechanisms, such as touch screen buttons if the display 104 is capable of sensing touch by a human finger or a stylus. For example, selection of Project A may be made by touching the project A folder icon. Other control mechanisms, such as voice control, may be used if supported by the device 100.

In FIG. 5B, a drawing for Project A is selected. Various icons may be presented such as page selection icons 530 and icons 532 for performing other functions (e.g., zooming in and out ("+" and "−"), rotating the drawing (curved arrow), highlighting a portion of the drawings ("H"), adding/modifying/removing text ("T"), and adding/modifying/removing drawing items such as lines ("D")). Some icons may lead to additional layers of icons. For example, the text icon "T" may open a list of available text options (e.g., fonts, italics, bold, underlined, and font size) when selected. The drawing icon "D" may open a list of available drawing options (e.g., lines, curves, predefined shapes, line width, and line color) when selected.

A display area 534 includes a full-size or half-size drawing 536 that has the same physical dimensions as previously used paper drawings. In the present example, the drawing 536 is only a partial drawing for purposes of illustration, but may actually be a full 1:1 scale drawing. It is noted that the display 104 is larger than the display area 534 in the present example, meaning that the display 104 provides a viewing surface that is larger than the dimensions of the drawing standard represented by the display area 534.

It is understood that the graphics provided by the display 104 may include many different representations, icons, and arrangements, and may include overlays of various types that allow a user to interact with a drawing. In some embodiments, for example, a user may choose to display various icons (e.g., representing a drawing sheet index) on any one or more of the display's edges.

Figure 6A:
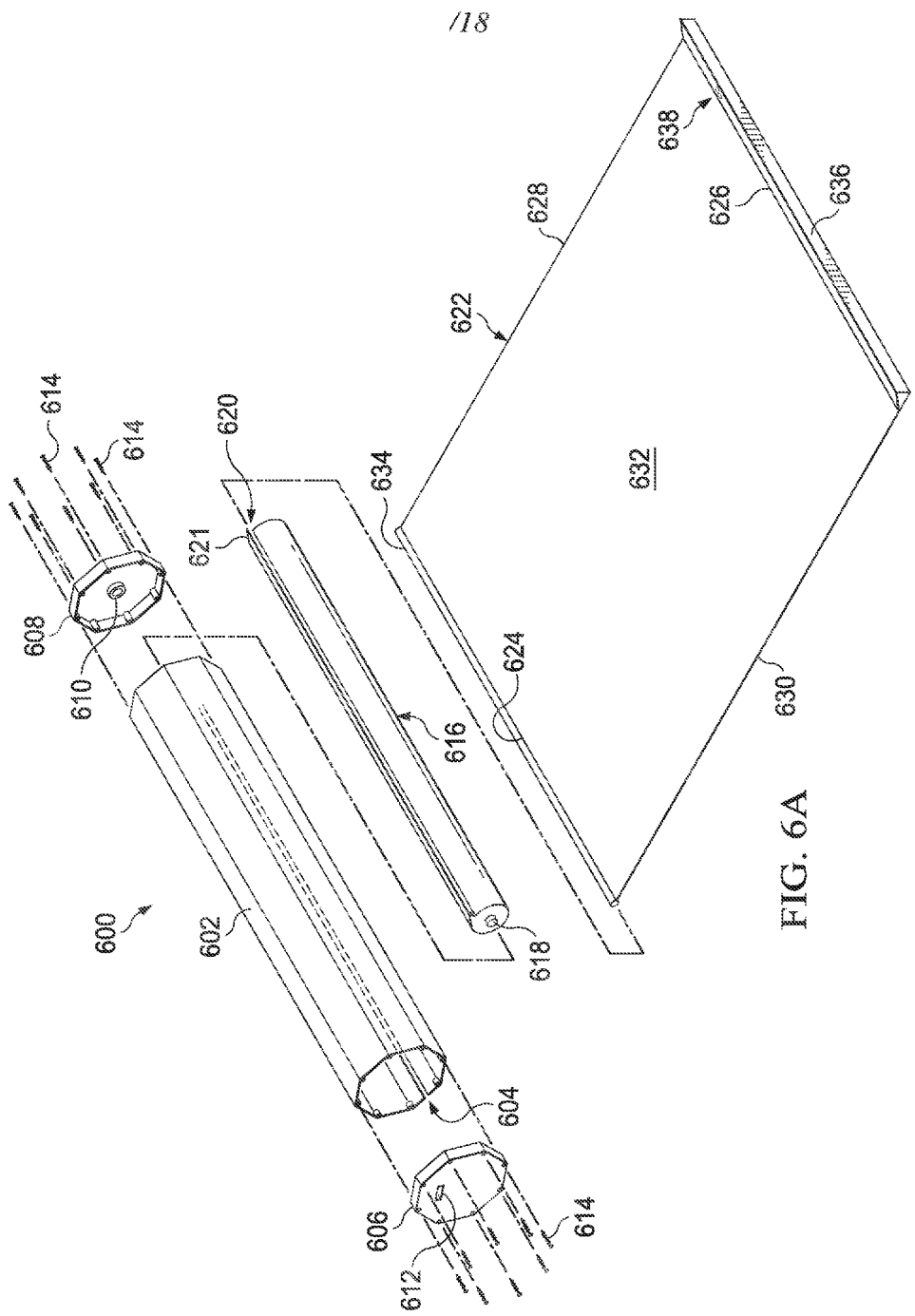
FIGS. 6A and 6B illustrate an exploded view and a non-exploded orthogonal view, respectively, of a more detailed embodiment of the device of FIG. 1A.

Referring to FIG. 6A, one embodiment of a device 600 is illustrated that provides a more detailed example of the device 100 of FIGS. 1A-1C. The device 600 includes a housing 602 that has an elongated opening 604 (e.g., a slit) that extends partially or completely down the length of the housing. The housing 602 is substantially hollow, although support structures may be built into the housing 102 for strength and/or to provide attachment points for electronic components and/or mechanical components (e.g., fans, a tension mechanism, and/or a locking mechanism). While the housing 602 is shown with an octagonal cross-section in the present embodiment, it is understood that the cross-sectional configuration may vary greatly.

The width (e.g., the diameter in the present example) and length of the housing 602 may also vary as long as they meet certain limitations. For example, the length is based on the height of a display 622 and so the display height would impose a minimum length limitation on the housing 602. The width is based on the size of a core 616 when the display 622 is rolled around the core 616. The width may also provide additional space for various electronic components if they are not included within the core 616.

The open ends of the housing 602 are closed by end caps 606 and 608. Each end cap 606 and 608 includes an axis mount 610 (shown only for the end cap 608 in FIG. 6). In the present embodiment, the axis mounts 610 are positioned along the longitudinal axis of the housing 602, although they may be differently positioned in other embodiments. One or both end caps 606 and 608 may include one or more ports 612 (e.g., a universal serial bus (USB) port) that provide access to electronic components inside the housing 602 when the end caps 606 and 608 are in place. Fasteners (e.g., screws) 614 are used to attach the end caps 606 and 608 to the housing 602.

Figure 8C:
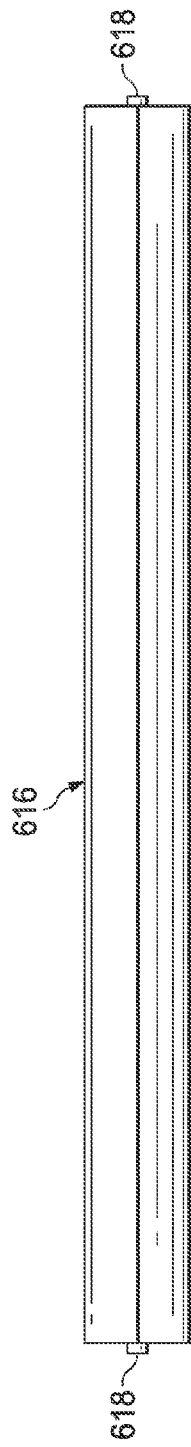
Figure 8D:
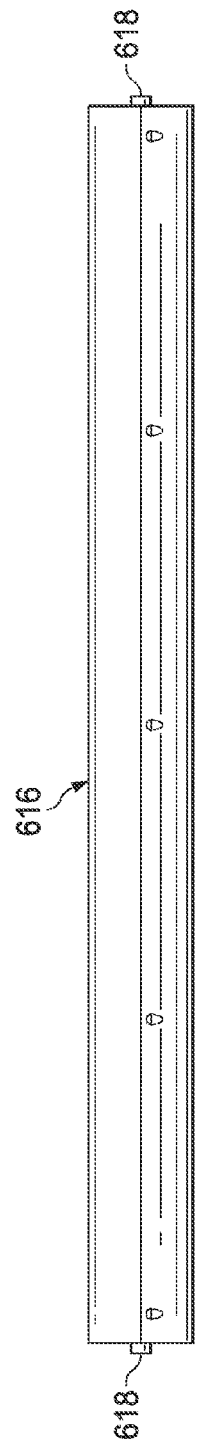
Figure 8E:
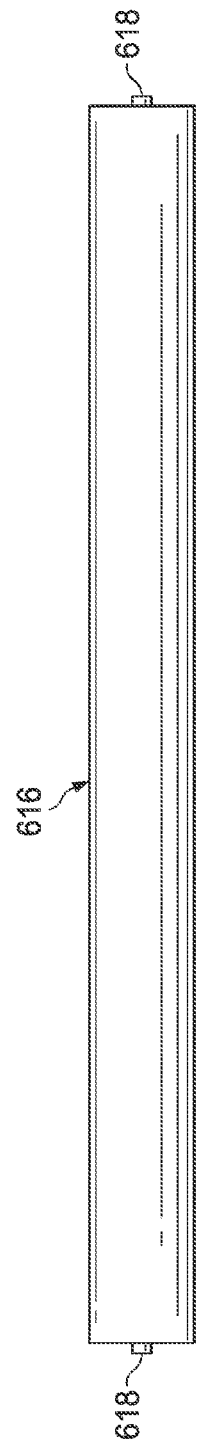

In some embodiments, such fasteners may be omitted. For example, in an embodiment where the housing 602 has a circular cross-section, the end caps 606 and 608 may be threaded and may engage corresponding threads on the housing 602. In another embodiment, the end caps 606 and 608 may use an interference fit to snap to or otherwise connect to the housing 602. In still another embodiment, one of the end caps 606 and 608 may be permanently attached to its respective end of the housing 602. In yet another embodiment, the housing 602 may open from the side. For example, the housing 602 may have a removable panel or the housing 602 may be hinged to open up. In another example, the housing 602 may be formed as two halves that are fastened together (as will be described below with respect to the core 616 in FIG. 8A). In such embodiments, one or both of the end caps 606 and 608 may be removable or permanently attached.

The core 616 is configured to fit within the housing 602. The core 616 includes axis bearings 618 that fit into the axis mounts 610 of the end caps 606 and 608. It is understood that the axis bearings 618 and axis mounts 610 may be switched in some embodiments, with the axis bearings 618 positioned on the end caps 606 and 608 and the axis mounts 610 positioned on the ends of the core 616. In another embodiment, one of the end caps 606 and 608 may have an axis bearing 618 and the other end cap may have an axis mount 610, with the core 616 having a corresponding axis mount 610 and axis bearing 618.

The core 616 includes an opening 620 (e.g., a slot) that is configured to capture an edge of the display 622. The core 616, which is substantially cylindrical in shape, may include a slope 621 that provides both a location for the opening 620 and also aids in rolling up the display 622 without damaging the display 622.

The display 622 is substantially rectangular in shape with a left edge 624, a right edge 626, a top edge 628, a bottom edge 630, and a display surface 632. It is understood that terms such as "left," "right," "top," and "bottom" are from the perspective of FIG. 6A and are for purposes of description only. The left edge 624 is coupled to or includes a bar 634 that physically couples the display 622 to the core 616. More specifically, the bar 634 fits into the opening 620 of the core 616 and provides a substantially continuous connection point between the display 622 and the core 616. The bar 634 may also include electronic connections (e.g., traces) to electronically couple the display 622 to electronic components. For example, the bar 634 may slide into the opening 620 and engage a connection in the core 616 when fully inserted into the opening 620. In other embodiments, one or more other attachment points (e.g., a plug or other connection) may be provided to couple the display 622 to the electronic components in a manner that bypasses the bar 634.

The edge 626 of the display 622 is coupled to an end bar 636, although it is understood that the end bar 636 may not be present in all embodiments. The end bar 636 is too large to fit through the slot 604 in the housing 602 and thereby serves as a stop to prevent the entire display 622 from entering the housing 602. The end bar 636 is used to grasp the display 622 for removal from the housing 602. In some embodiments, the end bar 636 may be weighted sufficiently to keep the display 622 from rolling up when pulled out. The end bar 636 may include control features 638 in some embodiments.

Figure 6B:
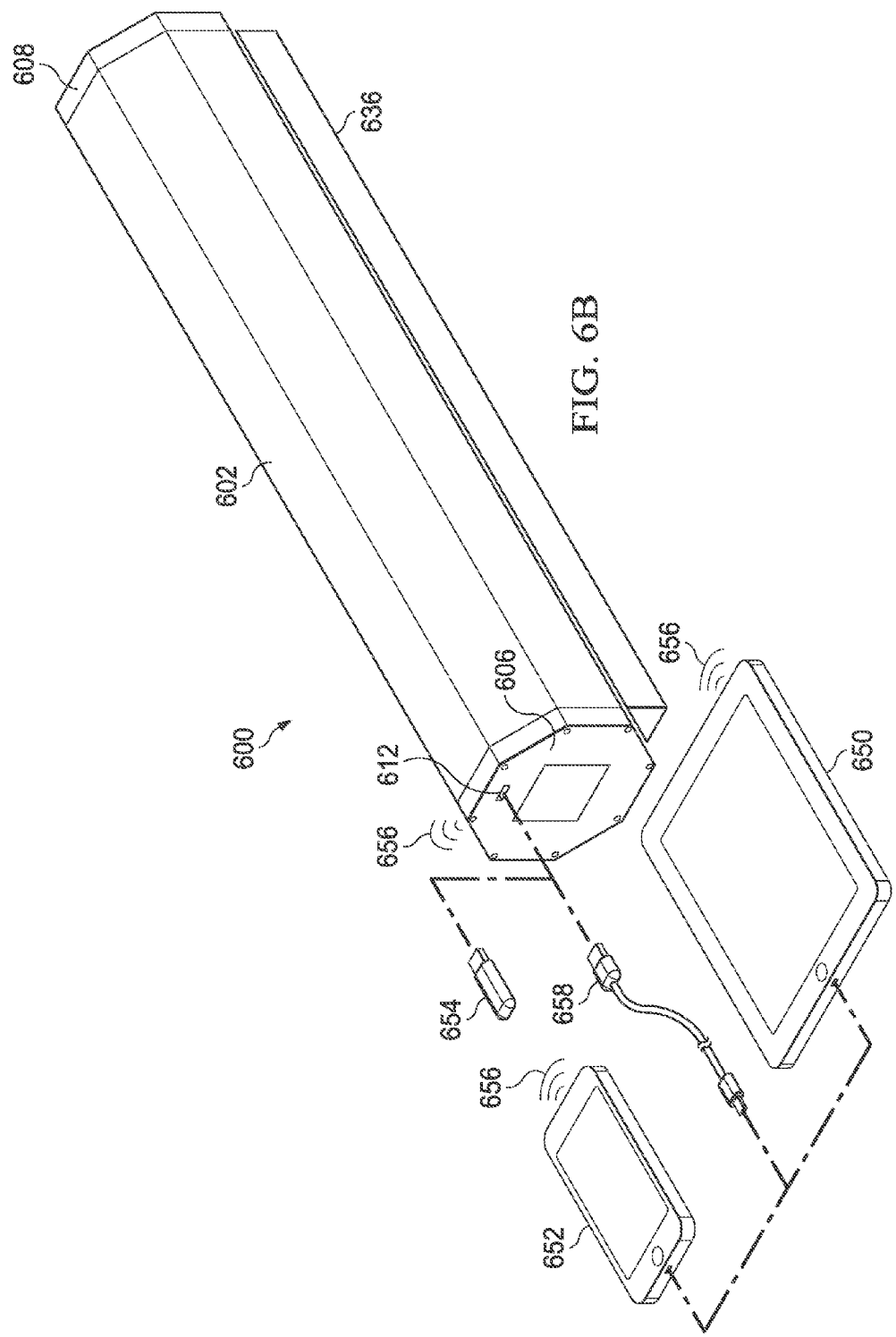

Referring to FIG. 6B, the embodiment of FIG. 6A is illustrated with external devices such as portable digital devices 650 and 652, and a memory device 654 such as a USB drive. The device 600 may communicate wirelessly as indicated by lines 656 and/or via wire 658. The memory device 654 may interact with the device 600 via the port 612. It is understood that these are merely examples and that the device 600 may communicate with many other devices as described elsewhere in the present disclosure.

Figure 7A:
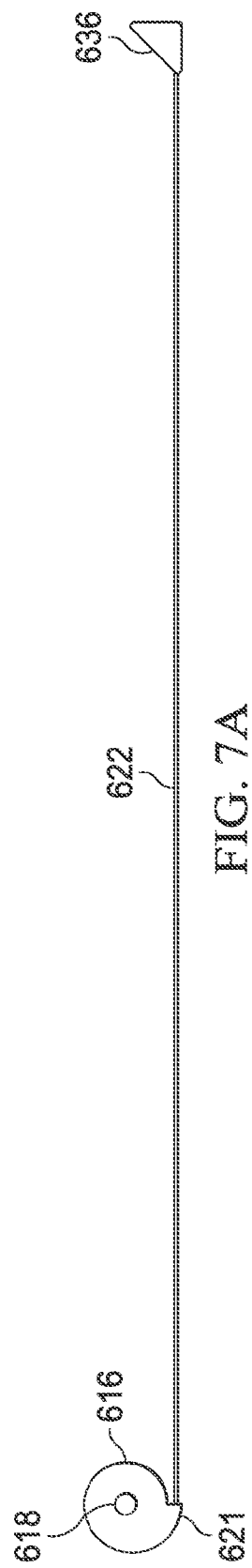
FIGS. 7A-7C illustrate a side view with a display unrolled, a top view with the display unrolled, and a side view with the display rolled up, respectively, of one embodiment of a display that may be used with the device of FIG. 6A.
Figure 7C:
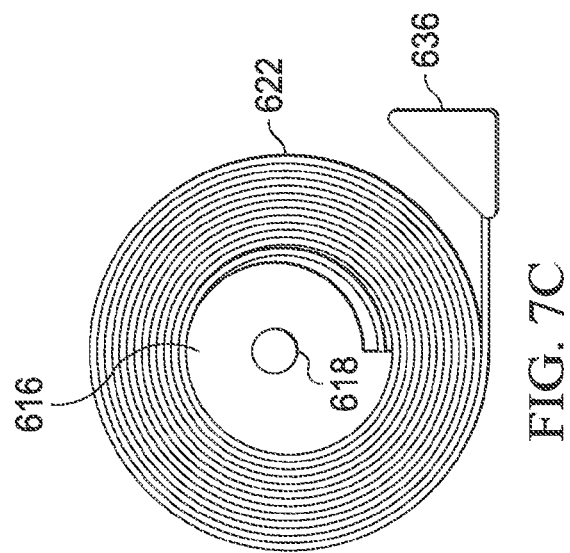
Figure 7B:
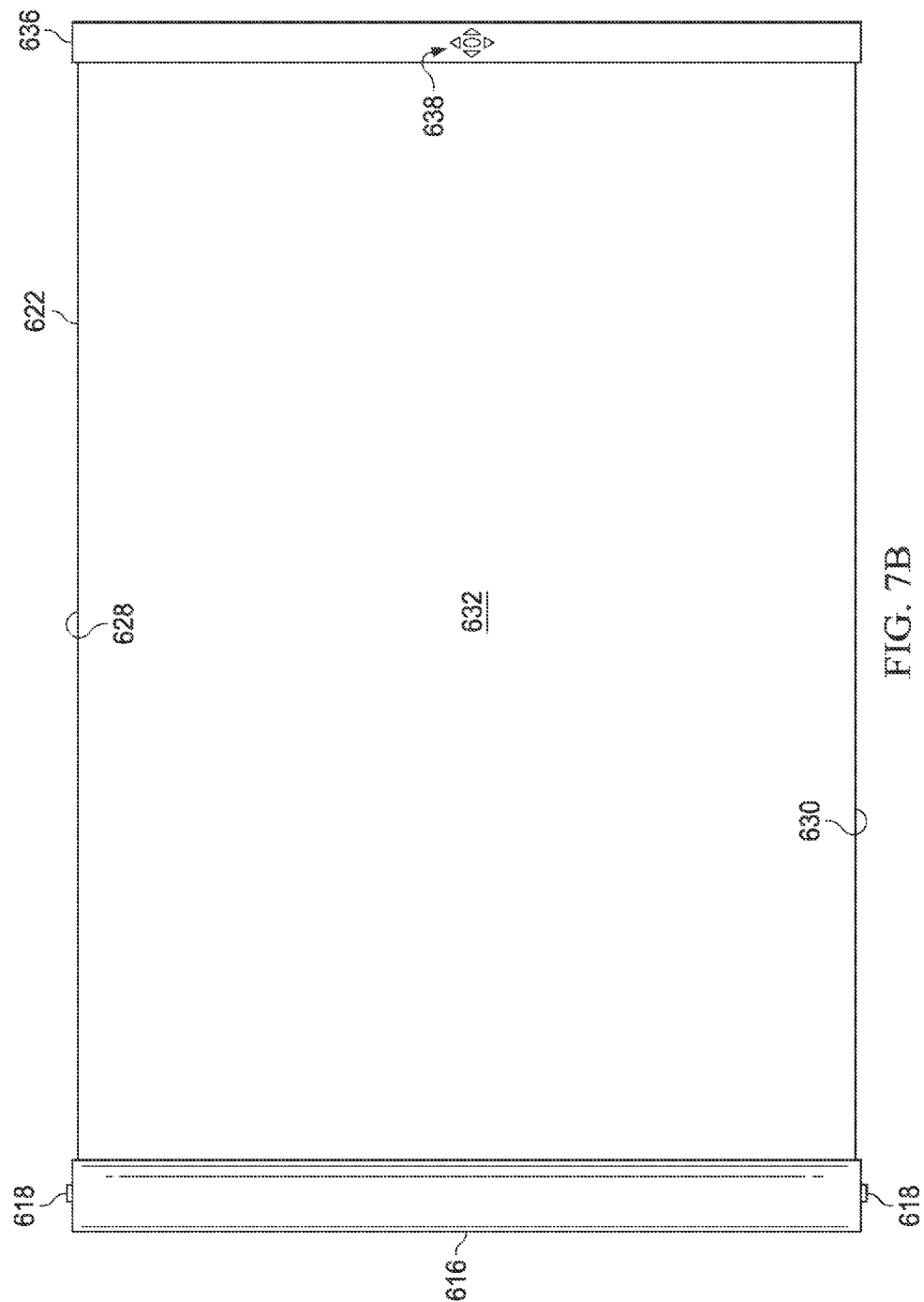

Referring to FIGS. 7A-7C, one embodiment of the display 622 of FIG. 6 coupled to the core 616 is illustrated in an unrolled side view (FIG. 7A), unrolled top view (FIG. 7B), and rolled side view (FIG. 7C). The slope 612 of the core 616 is illustrated in FIG. 7A.

Referring to FIGS. 8A-8G, one embodiment of the core 616 of FIG. 6 is illustrated in greater detail. In the present embodiment, the core 616 contains electronic components 802 needed to control and power the display 622. To accommodate the electronic components 802, the core 622 includes an upper shell 804 and a lower shell 806. The upper shell 804 and lower shell 806 may be coupled via tabs 808 that fit into slots (not shown) and fasteners 810 (e.g., screws). Other coupling mechanisms, such as an interference fit, may be used in some embodiments.

In the present example, the electronic components 802 may be coupled to the lower shell 806. For example, circuit boards may be screwed or snapped into receiving sockets positioned in the lower shell 806 or to a support structure that is coupled to or formed as part of the lower shell 806. A battery clip or other fastener may be provided to lock a battery into place and so forth. It is understood that the manner in which the electronic components 802 are coupled to the lower shell 806 may vary based on various factors such as the internal dimensions of the core 616, the actual electronic components 802 to be placed inside the core 616, and/or the material used to manufacture the core 616.

Figure 8F:
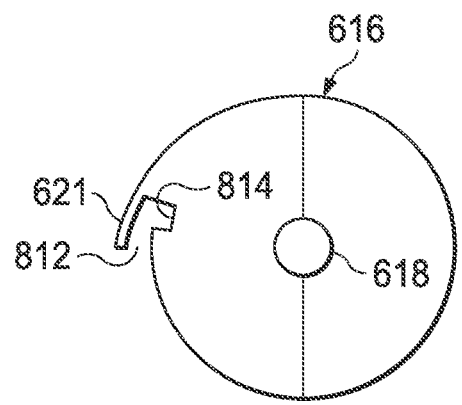
Figure 8G:
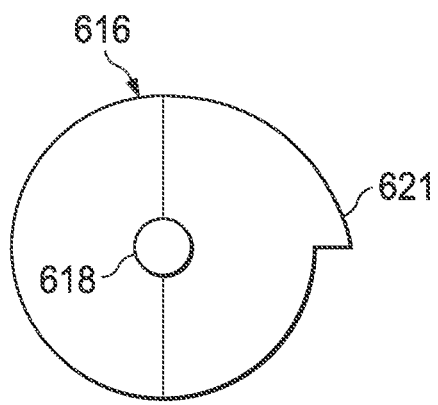
Figure 9A:
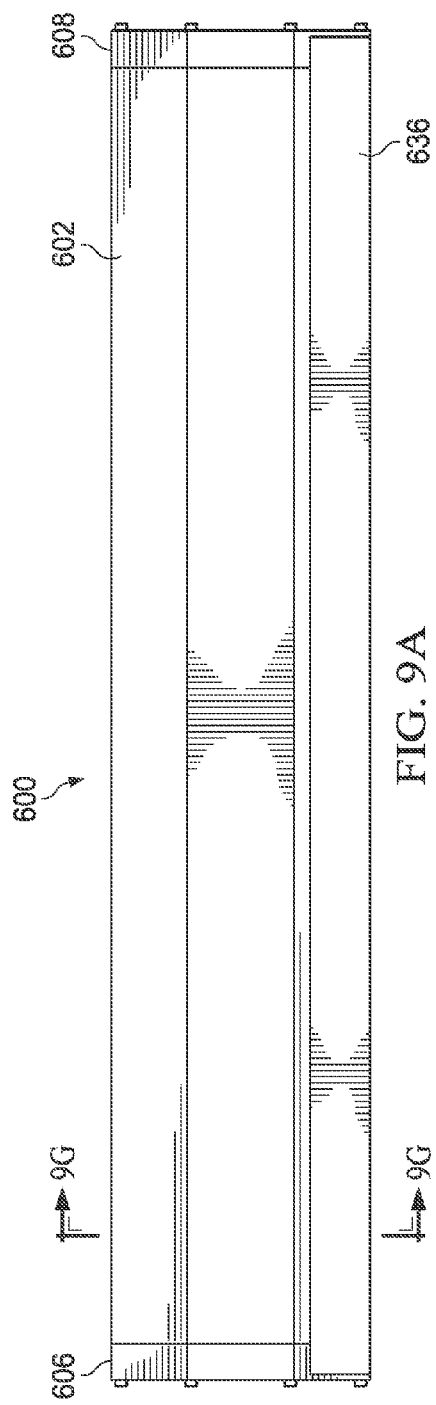
Figure 9B:
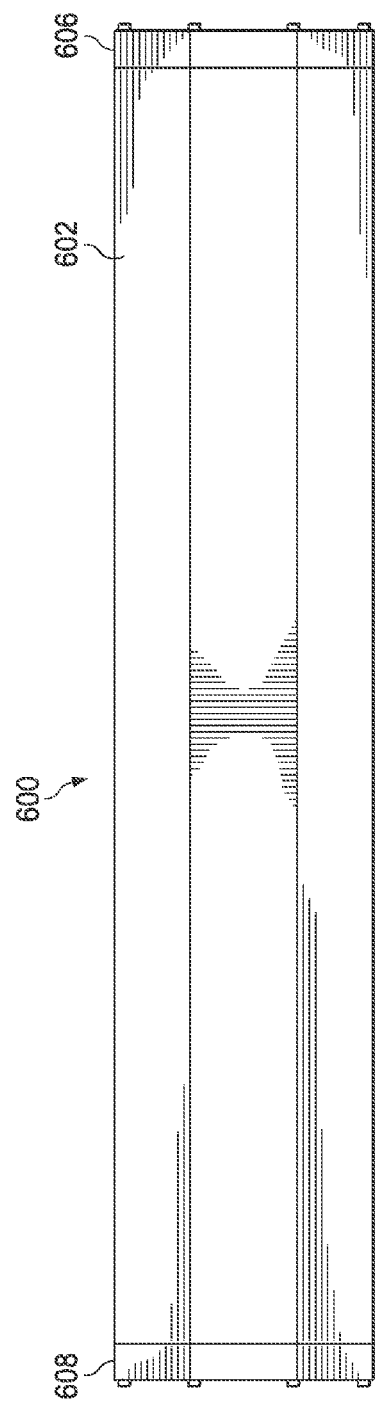
Figure 9E:
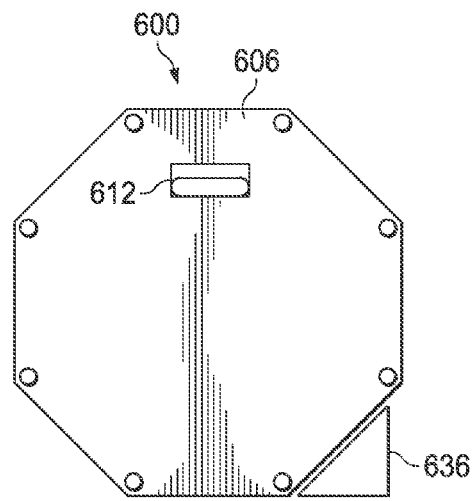
Figure 9F:
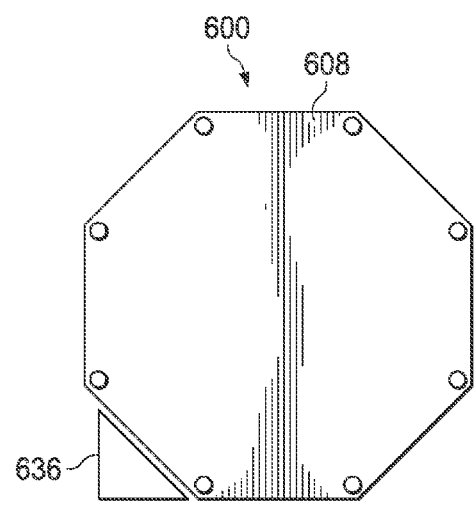
Figure 9G:
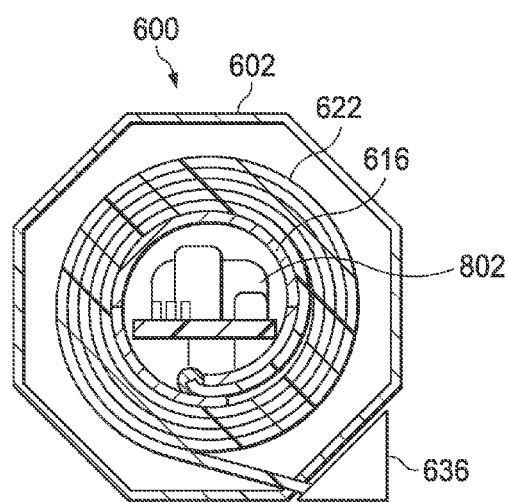
FIG. 9G illustrates a cutaway side view of one embodiment of the device of FIG. 9A taken along lines B-B.

Referring specifically to FIGS. 8F and 8G, the opening 620 is illustrated in greater detail. In the present example, the opening 620 provides a slit 810 that connects a channel 812 to the outside of the core 616. The bar 634 slides into the channel 812 with the display 622 exiting the channel 812 through the slit 810. The slit 810 and/or channel 812 may be closed on one end as illustrated in FIG. 8G. In some embodiments, a locking mechanism (not shown) may be used to prevent the bar 634 from sliding out of the channel 812. For example, a tab or clip may be moved over the open end of the channel 812 once the bar 634 has been inserted. In other embodiments, the bar 634 may fit tightly enough that it does not move within the channel 812 once inserted.

Referring to FIGS. 9A-9G, one embodiment of the housing 602 of FIG. 6 is illustrated in greater detail. In the present embodiment, electronic components 802 (FIG. 8) are positioned inside the core 616.

Referring to FIGS. 10A and 10B, another embodiment of the housing 602 of FIG. 6 is illustrated in greater detail. In the present embodiment, electronic components 802 (FIG. 8) are positioned in the housing 602 but outside of the core 616. In such embodiments, the housing 602 may have a different cross-section than the embodiment of FIGS. 9A-9G as space is needed for both the core 616 and the separately mounted electronic components 802.

Referring generally to the devices 100 of FIGS. 1 and 600 of FIG. 6, such devices are modular in nature. More specifically, using the device 600 as an example, the core 616 may be easily removed from the housing 602. This enables the core 616, display 622, and/or electronic components 802 to be easily replaced, as well as allowing them to be removed for replacement of the housing 602 if needed.

For example, assume that the device 600 is not operating correctly because the display 622 has been physically damaged. To repair the device 600, the end cap 608 may be removed and the core 616 may be extracted from the housing 602. Removal of the core 616 may require removal of the end bar 636 from the edge 626 so that the edge 626 can pass through the opening 604. Alternatively, removal of the core 616 may require removal of the bar 634 from the core 616 so that the edge 624 can be passed through the opening 604. Once removed, a new display 622 can be slid into the opening 620 of the core 616 and the end cap 608 can be recoupled to the housing 602. In embodiments where the housing 602 is in two separable halves, the two halves may be separated. Once separated, a new display 622 can be slid into the opening 620 of the core 616 and the two halves can be rejoined.

Other components, including the core 616 and the electronic components 802, may be easily removed and replaced as needed. This modularity also makes upgrading the device 600 relatively easy as long as the upgrades are compatible with the physical structure of the device 600. For example, changing the display 622 out for a better display, upgrading the memory or CPU, and otherwise increasing the capabilities of the device 600 may be accomplished with minimal effort.

In some embodiments, the housing may be absent entirely and the core may contain the circuitry needed to communicate with and control the display. For example, the core and display of FIGS. 7A-7C may provide the basic device. In such embodiments, control features may be provided by an external device, on the core itself, or using an attachment that couples to the core.

It will be appreciated by those skilled in the art having the benefit of this disclosure that this electronic retractable blueprint display device is portable, provides for viewing full size drawings at a 1:1 scale, and is easily updated and maintained. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A modular display device for providing a digital representation of a blueprint comprising:
   an elongated housing having a closed first end, a closed second end, and an elongated opening extending at least partially between the first and second ends, wherein the opening is parallel to a longitudinal axis of the housing;
   a substantially cylindrical core configured to fit inside the housing in a rotatable manner;
   a flexible display configured to move between a first state where a majority of the flexible display is positioned inside the housing and rolled around the core and a second state where a majority of the flexible display is moved out of the housing while rotating the core through the opening and positioned outside of the housing to form a viewing surface, the flexible display having a first edge secured to the core, wherein a height and a width of the flexible display are sufficient to provide a 1:1 scale view of a drawing having dimensions defined by a predetermined drawing standard;
   a plurality of electronic components positioned inside the housing and within the core and rotatable with the core, the electronic components operable to generate signals to control and/or power the flexible display and including a processor, a memory coupled to the processor, display circuitry coupled to the processor and the flexible display, and a power supply coupled to the processor, the memory, and the flexible display, wherein the electronic components can be easily replaced by replacement of the core; and
   a communication interface to the exterior of the elongated housing to allow communication with an external communication device while the elongated housing is rotating with respect thereto and at all rotatable positions thereof.

2. The modular display device of claim 1 further comprising a wire coupling the processor to one of a control feature and to a communication port on the exterior of the housing through the communications interface.

3. The modular display device of claim 2 wherein the wire is attached via a slip ring connection as the communication interface, wherein rotation of the core relative to the housing does not negatively affect the wire, which also rotates with the core.

4. The modular display device of claim 1 wherein the core includes a channel configured to secure the first edge to the core by receiving in the channel a bar coupled to the first edge.

5. The modular display device of claim 4 wherein the core further includes a sloped surface that forms at least a part of the channel.

6. The modular display device of claim 1 further comprising at least one control feature positioned on an exterior side of the housing, wherein the at least one control feature is coupled to the processor.

7. The modular display device of claim 1 wherein a second edge of the flexible display is coupled to a stop bar that is positioned outside of the housing, wherein the stop bar is too large to pass through the opening in the housing.

8. The modular display device of claim 7 further comprising at least one control feature positioned on the stop bar, wherein the at least one control feature is coupled to the processor.

9. The modular display device of claim 1 wherein the flexible display is an electronic ink display.

10. The modular display device of claim 1 further comprising a tension mechanism configured to place tension on the core to rotate the core in a direction that places the flexible display in the first state.

11. The modular display device of claim 10 further comprising a locking mechanism configured to offset the tension produced by the tension mechanism and lock the flexible display in the second state.

12. The modular display device of claim 1 further comprising a removable end cap configured to couple to the first end, wherein decoupling the removable end cap from the first end enables the core to be removed from the housing.

13. The modular display device of claim 1 wherein a longitudinal axis of the core lies along the longitudinal axis of the housing.

14. The modular display device of claim 1 wherein a longitudinal axis of the core is parallel to the longitudinal axis of the housing but offset from the longitudinal axis of the housing.

15. The modular display of claim 1, wherein the communication interface is a USB interface and the external communication device is a USB interface.

16. A modular display device for providing a digital representation of a blueprint comprising:
   an elongated housing having an elongated opening parallel to a longitudinal axis of the housing;
   a core configured to fit inside the housing in a rotatable manner, wherein a longitudinal axis of the core is parallel to the longitudinal axis of the housing;
   a flexible display configured to move between a first state where a majority of the flexible display is positioned inside the housing and rolled around the core and a second state where a majority of the flexible display is moved out of the housing through the opening during rotation of the core and positioned outside of the housing to form a viewing surface, wherein a height and a width of the flexible display are sufficient to provide a 1:1 scale view of a drawing having dimensions defined by a predefined drawing standard;
   a plurality of electronic components positioned inside the housing and within the core and rotatable with the core, wherein the electronic components are operable to generate signals to control and/or power the flexible display and can be easily replaced by replacement of the core and wherein the plurality of electronic components comprise a processor, a memory coupled to the processor, display circuitry coupled to the processor and the flexible display, and a power supply coupled to the processor, the memory, and the flexible display; and
   a communications interface to the exterior of the elongated housing to allow communication with an exterior communication device while the elongated housing is rotating with respect thereto and at all rotational positions of the core.

17. The modular display device of claim 16 wherein the power supply is configured to power the flexible display and circuitry for receiving data from an external device via the communications device for display on the flexible display.

18. The modular display device of claim 16 wherein the height of the flexible display is at least thirty inches and the width is at least forty-two inches.

* * * * *